United States Patent [19]
Johnson et al.

[11] Patent Number: 5,215,557
[45] Date of Patent: Jun. 1, 1993

[54] DRY SCRUBBER WITH INTEGRAL PARTICULATE COLLECTION DEVICE

[75] Inventors: Dennis W. Johnson, Barberton; Robert B. Myers; Donald P. Tonn, both of Copley Township, Summit County, all of Ohio

[73] Assignee: The Babcock & Wilcox Company, New Orleans, La.

[21] Appl. No.: 904,304

[22] Filed: Jun. 24, 1992

[51] Int. Cl.$^5$ .................... B03C 3/01; B01D 47/06
[52] U.S. Cl. .................................. 55/122; 55/126; 55/230; 55/259; 55/341.1
[58] Field of Search ............. 55/122, 124, 126, 230, 55/257.1, 259, 73

[56] References Cited

U.S. PATENT DOCUMENTS

| | | | |
|---|---|---|---|
| 1,103,509 | 7/1914 | Harker | 55/259 |
| 2,565,106 | 8/1951 | Wastvind et al. | 55/126 X |
| 3,315,444 | 4/1967 | De Seversky | 55/122 |
| 3,315,445 | 4/1967 | De Seversky | 55/122 |
| 3,444,668 | 5/1969 | Masuda | 55/257.1 X |
| 3,706,182 | 12/1972 | Sargent | 55/122 X |
| 3,745,939 | 7/1973 | Allbritton | 55/259 X |
| 4,225,326 | 9/1980 | Hummel et al. | 55/257.1 |
| 4,229,411 | 10/1980 | Kisters et al. | 55/126 X |
| 4,473,438 | 9/1984 | Loureiro | 55/257.1 X |
| 4,481,171 | 11/1984 | Baran et al. | 55/230 X |
| 4,530,822 | 7/1985 | Ashley et al. | 55/230 X |
| 4,579,569 | 4/1986 | Sheng et al. | 55/259 X |
| 4,874,400 | 10/1989 | Jury | 55/230 X |
| 5,135,611 | 8/1992 | Cameron | 55/259 X |

Primary Examiner—Robert Spitzer
Attorney, Agent, or Firm—Robert J. Edwards; Michael L. Hoelter

[57] ABSTRACT

An integrated dry scrubber and particulate collection device for removing sulfur oxides and other contaminants from combustion flue gas and also for removing particulates from this gas, such operations occurring in a single, integrated unit or assembly. In some instances, this combination device may be located in the lower portion of a chimney or stack.

14 Claims, 3 Drawing Sheets

DRY SCRUBBER WITH INTEGRAL PARTICULATE COLLECTION DEVICE

FIELD OF THE INVENTION

This invention pertains to the removal of particulates, sulfur oxides, and/or other contaminants from combustion flue gases and more particularly to the integration of a dry flue gas desulfurization device with a particulate collection device.

BACKGROUND OF THE INVENTION

As is well known, particulates such as fly ash, sulfur oxides, and/or other contaminants must be removed from combustion exhaust gases in order to comply with federal, state and possibly local emission requirements. These gases usually result from the combustion of coal or other fossil fuel and they often are emitted from power generating facilities, waste-to-energy plants, and/or other industrial processes.

Known methods of accomplishing sulfur and other contaminant removal include utilizing fossil fuels having a low content of such contaminants. Lacking such a supply of fuel or in addition to the use of such fuel, sulfur and/or contaminant content can also be reduced prior to combustion via mechanical or chemical processes. One major disadvantage of such mechanical or chemical processing is the cost required to achieve the desired level of sulfur or contaminant removal.

A method of removal occurring after combustion involves mixing dry alkali material either with the fuel prior to combustion or injecting such material directly into the hot combustion gases after combustion has occurred. This will enable the then available alkali to remove sulfur oxides and other contaminants via absorption or adsorption followed by oxidation. Unfortunately, this method fouls the heat transfer surfaces which necessitates more frequent soot blowing. Other disadvantages include low to moderate removal efficiencies, poor reagent utilization, and increased particulate loadings in the combustion gases. This last disadvantage may also require further conditioning (i.e. humidification or sulfur trioxide injection) of the combustion gas if an electrostatic precipitator is used for downstream particulate collection.

Alternately, a method known as wet chemical absorption (i.e. wet scrubbing) may be used. In accordance with this method, the hot combustion gases are typically washed in an up flow gas liquid contact device with an aqueous alkaline solution or slurry. Such solution or slurry chemically alters and removes the sulfur oxides and other contaminants from the flue gases. The disadvantages of this method include the loss of liquid both to the atmosphere (i.e. due to saturation of the flue gas and mist carry-over) and the sludge produced during this process. Additional disadvantages pertain to the cost associated with the material needed for the construction of the absorber module and all related downstream auxiliary equipment (i.e. primary/secondary dewatering and waste water treatment subsystems).

The method known as "dry scrubbing" (i.e. spray drying chemical absorption process) may also be utilized to remove sulfur oxides and other contaminants from the flue gases. In accordance with dry scrubbing, an aqueous alkaline solution or slurry is finely atomized (via mechanical, dual fluid, or rotary cup type atomizers) and sprayed into the hot flue gas. This contact chemically alters the sulfur oxides and other contaminants in the flue gas thereby leading to their removal. The major disadvantages to dry scrubbing being a moderate to high pressure drop across the spray dryer gas inlet distribution device and the limitation on temperature drop allowed in order to maintain controlled operations.

While the above methods pertain primarily to sulfur oxide and other contaminant removal, they do not necessarily address the removal of particulates such as fly ash and the like. To remove these particulates, a baghouse or an electrostatic precipitator (ESP) is often utilized.

A baghouse typically incorporates one or more fabric filters that trap particulate matter (dust) by direct impingement on the filter cloth. This method may be used as a means of dry particulate collection where the temperature and humidity of the gases to be handled are within an acceptable range. Typical types of baghouses include pulse-jet and reverse air types and such baghouses may often be positioned around the chimney through which the exhaust gases exit the facility.

Electrostatic precipitators utilize an electric charge that is applied to the particulate matter (dust) to be collected. This charge subsequently propels the particles, by electrostatic force, to the collecting curtain where they are removed from the flue gas. Such a method may be used provided the temperature and humidity of the flue gases are within an acceptable range. Typical types of electrostatic precipitators include rigid electrode, rigid frame and weighted wire types.

It is an object of this invention to provide a means of removing particulates in addition to sulfur oxides and other contaminants from exhaust flue gases in an efficient and economical manner. A main object of this invention is to combine a dry scrubber and a particulate collection device into a single integrated unit. Another object of this invention is to eliminate the need and thus the cost of ductwork normally required to transfer the flue gases between the two devices. Still another object of this invention is to configure a baghouse or other type of particulate collection device around a vertical co-current down flow dry scrubber. Yet another object of this invention is to save space at the facility by combining these two operations into a single piece of equipment. While the prior art discusses flue gas desulfurization systems in series with particulate collection devices, an object of this invention is to combine these components so that they become integral parts of the same vessel, device, or apparatus. Still another object of this invention is to incorporate these two devices together and install it in the unused space at the base of the chimney. These and other objects and advantages of this invention will become obvious upon further investigation.

SUMMARY OF THE INVENTION

This invention pertains to a dry scrubber/particulate collection device that combines both operations together into a single unit or assembly. The dry scrubber component consists of an upper flue gas entrance, a spray zone, and a lower flue gas exit. The particulate collection component, located downstream of the dry scrubber, can be isolated via one or more isolation dampers that are located between these components. To control the flow of flue gas through the particulate collection component, control means such as dampers are activated.

DETAILED DESCRIPTION OF THE DRAWINGS

Figure 1B:
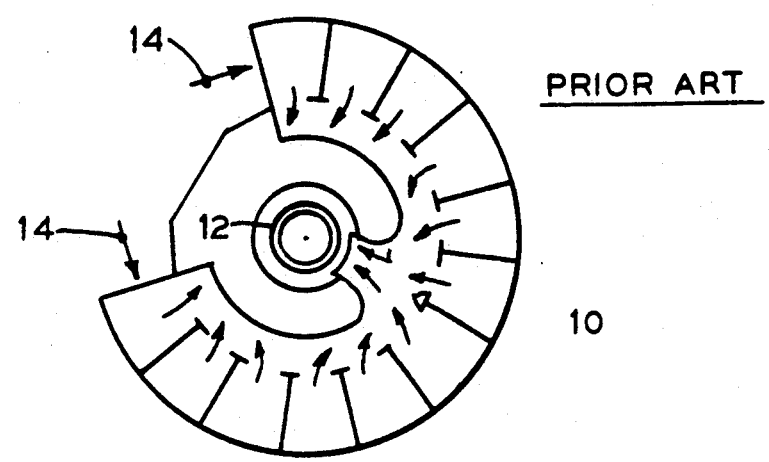
FIGS. 1a and 1b are schematic illustrations of a prior baghouse arrangement surrounding a chimney or stack.
Figure 1A:
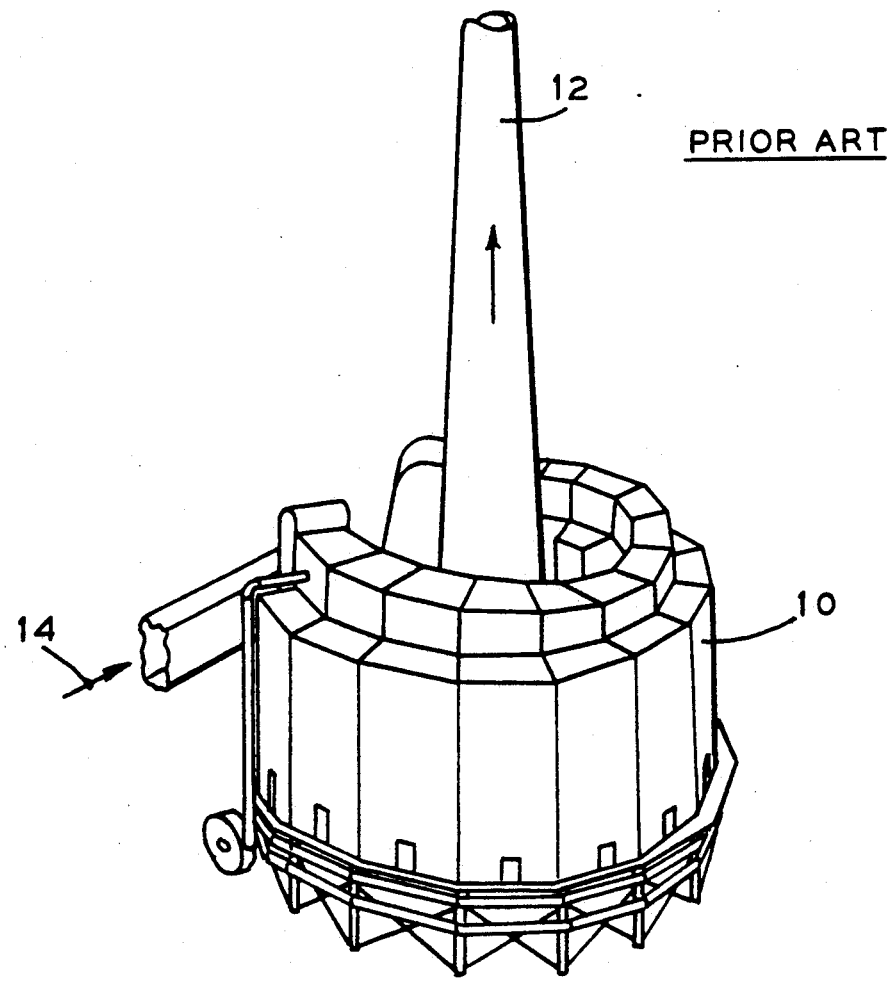

Referring initially to FIGS. 1a and 1b, there is shown a sketch illustrating a prior arrangement of a baghouse 10 around the base of chimney or stack 12. In this arrangement, flue gas 14 first enters baghouse 10 where any particulate material contained therein would be removed before proceeding on to stack 12. For most cases, if any sulfur oxides or other contaminants are also to be removed from flue gas 14, they are removed at some other location before such flue gas enters baghouse 10.

Figure 2:
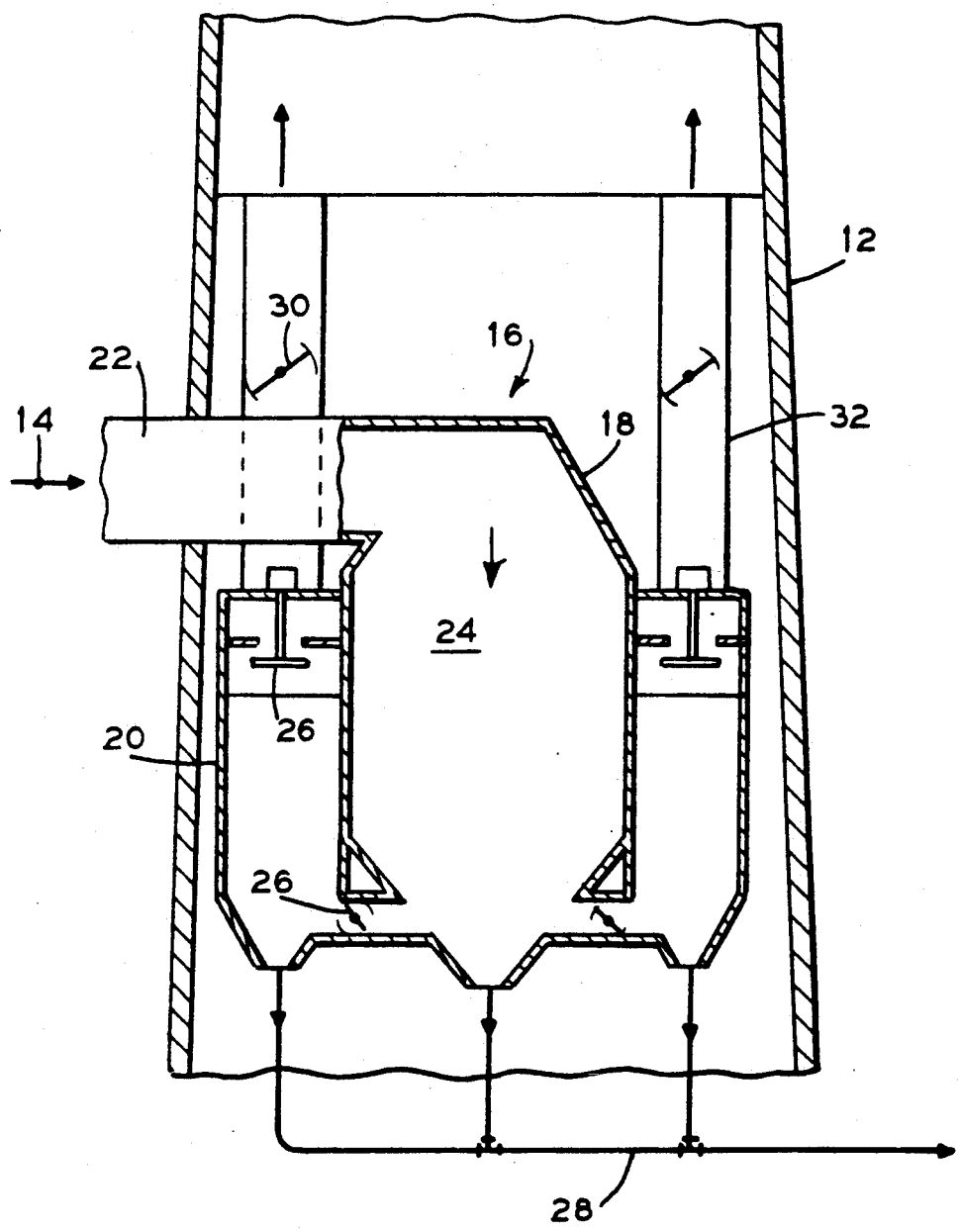
FIG. 2 is a schematic diagram, partially cut away for clarity, of the invention installed in the space at the base of the chimney or stack.
Figure 4:
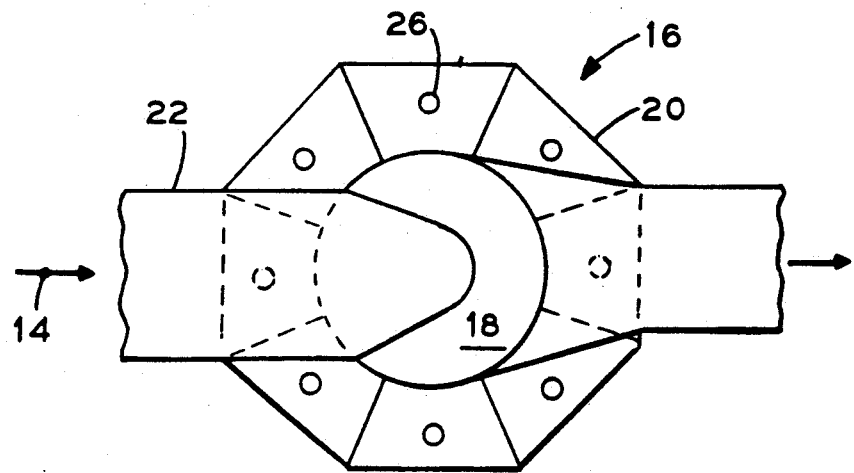
FIG. 4 is a plan schematic diagram, taken along lines 4—4 of FIG. 3, illustrating the particulate collection device surrounding the dry scrubber.
Figure 3:
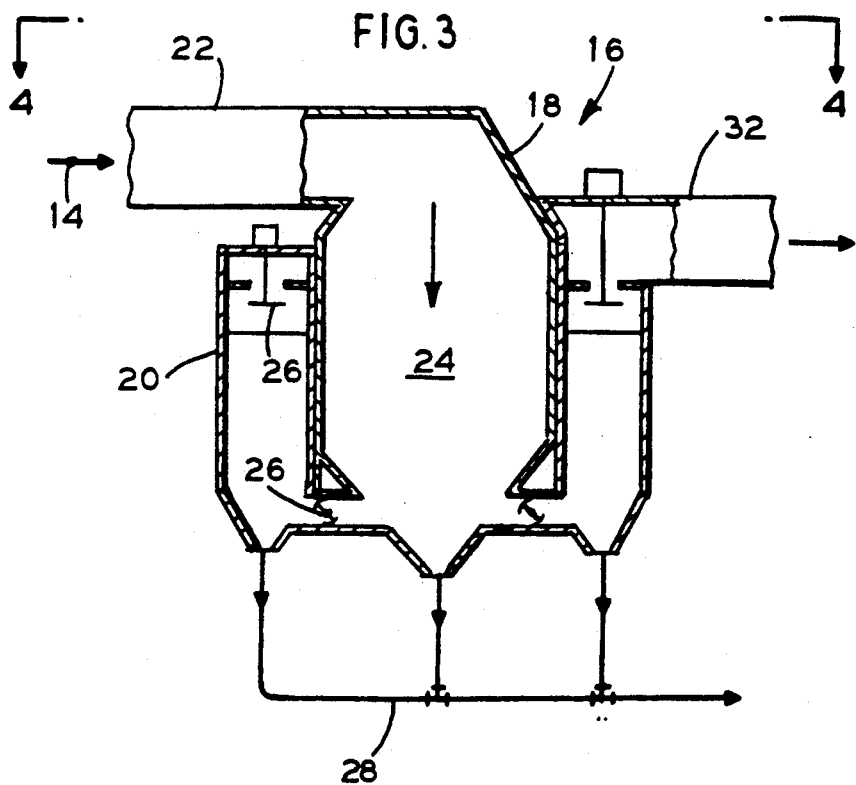
FIG. 3 is a schematic diagram, partially cut away for clarity, of the invention as it might be installed outside a chimney or stack.

In accordance with this invention, and as shown in FIGS. 2-4, there is shown assembly 16 which consists of dry scrubber 18 integrated with particulate collection device 20. Because these two previously separate operations are now combined into the same piece of equipment, spray drying and gas-solids separation can occur in less space and, as shown in FIG. 2, can occur within the base of stack 12. FIGS. 2-4 illustrate the preferred embodiment of a baghouse component.

As illustrated, particulate collection device 20, such as a baghouse or an electrostatic precipitator (not shown), is positioned around dry scrubber 18. It is preferable for device 20 to be concentrically located around scrubber 18 but it may also be positioned otherwise, space permitting. Furthermore, scrubber 18 would generally be a vertical co-current down flow dry scrubber, but other types or orientations of scrubber 18 are equally likely in accordance with this invention. Assembly 16 is intended to both remove sulfur oxides and other contaminants as well as particulates that are normally contained in flue gas 14 formed during the combustion of fossil fuels and/or waste materials.

Generally, hot flue gas 14 enters dry scrubber 18 through inlet hood 22 and is directed downward (a "down flow" dry scrubber is illustrated in the Figs. for explanation purposes only) to spray zone 24. This is typically accomplished via a gas flow distribution device (not shown) such as turning vanes, windbox/turbodiffuser, or roof gas disperser. Such a gas flow distribution device facilitates the mixing of flue gas 14 with sprayed droplets of an alkaline solution in spray zone 24.

While not shown in the drawings, the alkali solution sprayed within spray zone 24 is atomized by either a single or a multiple array of atomizers (i.e. dual-fluid, mechanical, or rotary type atomizers). These arrays distribute a homogeneous spray of a finely atomized alkali solution or slurry reagent into the hot flue gas 14 to absorb any sulfur oxides and/or other contaminants. Generally, within seconds, the heat of the flue gas evaporates the liquid droplets, resulting in a lower outlet gas temperature while also producing a relatively dry product that is subsequently removed. Alternatively, water can be sprayed into scrubber 18 should flue gas 14 contain alkali materials either naturally or by injection of these materials during, prior to, or after combustion of fossil fuels and/or waste materials. Such alkali materials could be introduced prior to or within scrubber 18.

As can be seen, the treated flue gas 14 continues to travel downward, exiting around the lower perimeter of spray zone 24. Such treated flue gas 14 is then channeled to pass through isolation dampers 26 that are used to isolate the various compartments of downstream particulate collection device 20. Any solids collected from dry scrubber 18 are directed to line 28 that transports such solids away from assembly 16.

After leaving "down flow" spray zone 24, the treated flue gas 14 makes a 180° turn, rising upwards into particulate collection device 20 such as a baghouse or an electrostatic precipitator. The pressure loss or drop between the exit of spray zone 24 and the entrance of particulate collection device 20 is minimal due to the elimination of any significant length of interconnecting flue work/transition sections between the two. Normally, long lengths of such sections are used to interconnect the prior art dry scrubber operation with the particulate collection operation thereby typically resulting in an undesirably large pressure loss.

The now treated and particulate laden flue gas 14 rises upward within the baghouse type particulate collection device 20 entering from the bottom of such device. If particulate collection device 20 incorporates a baghouse, then the preferred arrangement includes individual compartments which can be isolated by dampers 26. However, if an electrostatic precipitator is incorporated, this arrangement would utilize a series of fields for compartmentalization of collection device 20. Thus, depending upon the type of collector 20 being used, dampers 26 may be optional.

Flue gas 14 then passe through the fabric filters (if a baghouse) or the charging apparatus (if an electrostatic precipitator) (neither of which are shown) in device 20 whereupon any air-born particulates are deposited upon the entrance side of such filters. Afterwards, cleaned flue gas 14 exits the top of device 2 through additional isolation dampers 26 while the collected particulates are removed from the bottom via line 28. The flow of flue gas 14 through device 20 is controlled by dampers 30 if necessary while isolation dampers 26 isolate the individual compartments of device 20 in order to facilitate their cleaning and/or maintenance.

As shown in FIG. 2, should assembly 16 be incorporated into the base of chimney or stack 12, the now cleaned flue gas 14 will flow directly to the chimney liner. If assembly 16 is installed exterior to chimney or stack 12, the cleaned flue gas 14 leaving device 20 passes through plenum 32 directly to the discharge flue work.

Some of the advantages of integrating dry scrubber 18 with particulate collection device 20 is the fact that assembly 16 is now suited for installation power plants, incinerators, or waste-to-energy plants or facilities. This is because spray-dryer/fabric filter technology is favored for limiting emissions of acid gases ($SO_2$, $HCl$, $HF$, $H_2SO_4$, etc.), heavy metals (arsenic, cadmium, chromium, lead, mercury, etc.) and organic chemicals (dioxin, furans, etc.). Additionally, and due to the simplicity of design, assembly 16 is suitable for installation in the lower unused portion of chimney or stack 12.

Furthermore, assembly 16 occupies a smaller foot print than the current state of the art dry scrubber/baghouse or dry scrubber/electrostatic precipitator combinations, thus requiring less free space for installation. Other advantages pertain to a lower initial capital cost due to the elimination of interconnecting/transition flue work required to connect the dry scrubber outlet with the particulate collection device's inlet and the overall reduction in general of the various materials of construction including foundations, insulation/lagging, building enclosure, ash handling piping, etc. Additionally, a multiple, compact hopper design for the collection/storage of the ash/spray dried material exiting dry scrubber 18 minimizes/simplifies material handling piping requirements. It also reduces material handling equipment should the dried materials be reinjected within or prior to scrubber 18 due to the close proximity of the scrubber to the particulate collection device. Another advantage is a low or negligible pressure drop occurring across the transition from dry scrubber operation to particulate collection operation.

Alternate embodiments of this invention include incorporating a dry scrubber with integral baghouse particulate collection device into a LIDS (limestone injection dry scrubbing) type of process. In accordance with this process, limestone is injected into the upper combustion zone of a boiler or furnace with the resulting ash then being collected in the baghouse. The collected material is then mixed and injected into the dry scrubber to further increase overall sulfur dioxide and other contaminant removal efficiencies and reagent utilizations. Furthermore, in lieu of a baghouse or an electrostatic precipitator, other means may be employed for gas-solids separation and particulate collection.

What is claimed is:

1. A dry scrubber/particulate collection device comprising:
   a) a dry scrubber component having a flue gas entrance, a spray zone, and a flue gas exit;
   b) a particulate collection component downstream of said flue gas exit and capable of being isolated utilizing one or more isolation dampers located between said dry scrubber component and said particulate collection component, said dry scrubber component and said particulate collection component together comprising integral parts of a single assembly; and,
   c) control means for controlling the flow of flue gas through said particulate collection component of said assembly.

2. The apparatus as set forth in claim 1 wherein said dry scrubber component is a down-flow dry scrubber.

3. The apparatus as set forth in claim 2 wherein said control means comprise dampers to control the flow of combustion flue gas through said particulate collection component.

4. The apparatus as set forth in claim 3 wherein said particulate collection component is compartmentalized and further comprising isolation means for isolating individual compartments of said particulate collection component.

5. The apparatus as set forth in claim 4 wherein said particulate collection component is concentrically positioned around said dry scrubber component.

6. The apparatus as set forth in claim 4 wherein said assembly is installed in the lower portion of a chimney or stack.

7. The apparatus as set forth in claim 4 wherein said particulate collection component is a baghouse.

8. The apparatus as set forth in claim 4 wherein said particulate collection component is an electrostatic precipitator.

9. A dry scrubber/particulate collection device comprising:
   a) a down flow dry scrubber component having a flue gas entrance, a spray zone, and a flue gas exit;
   b) a particulate collection component downstream of said flue gas exit incorporating a series of individual compartments or fields, said dry scrubber component and said particulate collection component together comprising integral parts of a single assembly; and,
   c) control means for controlling the flow of flue gas through said particulate collection component of said assembly, said control means comprising dampers to control the flow of combustion flue gas through said particulate collection compartment.

10. The apparatus as set forth in claim 9 further comprising isolation means for isolating said individual compartments of said particulate collection component.

11. The apparatus as set forth in claim 10 wherein said particulate collection component is concentrically positioned around said dry scrubber component.

12. The apparatus as set forth in claim 10 wherein said assembly is installed in the lower portion of a chimney or stack.

13. The apparatus as set forth in claim 10 wherein said particulate collection component is a baghouse.

14. The apparatus as set forth in claim 10 wherein said particulate collection component is an electrostatic precipitator.

* * * * *